US 9,609,396 B2

(12) United States Patent
Simoes Rodrigues et al.

(10) Patent No.: US 9,609,396 B2
(45) Date of Patent: Mar. 28, 2017

(54) SYSTEM FOR RETRIEVAL OF EXECUTABLE APPLICATIONS

(71) Applicant: Sony Europe Limited, Weybridge (GB)

(72) Inventors: Jose Alexandre Simoes Rodrigues, Landshut (DE); Tassilo Volker Raesig, Landshut (DE)

(73) Assignee: Sony Europe Limited, Weybridge (GB)

( * ) Notice: Subject to any disclaimer, the term of this patent is extended or adjusted under 35 U.S.C. 154(b) by 0 days.

(21) Appl. No.: 14/444,549

(22) Filed: Jul. 28, 2014

(65) Prior Publication Data
US 2014/0337908 A1 Nov. 13, 2014

Related U.S. Application Data

(63) Continuation of application No. 12/772,495, filed on May 3, 2010, now Pat. No. 8,793,720.

(30) Foreign Application Priority Data

May 13, 2009 (EP) .................................... 09006484

(51) Int. Cl.
  *H04N 21/81* (2011.01)
  *H04N 21/443* (2011.01)
  (Continued)

(52) U.S. Cl.
  CPC ..... *H04N 21/8173* (2013.01); *H04N 7/17318* (2013.01); *H04N 21/25808* (2013.01);
  (Continued)

(58) Field of Classification Search
  None
  See application file for complete search history.

(56) References Cited

U.S. PATENT DOCUMENTS 7,379,705 B1 * 5/2008 Rados et al. ................. 455/2.01
8,601,162 B1 * 12/2013 O'Shaughnessy ...... H04L 67/06
                                                  709/200
(Continued)

FOREIGN PATENT DOCUMENTS

EP    2 015 578 A1    1/2009
JP    2003-209759 A   7/2003
(Continued)

OTHER PUBLICATIONS

Office Action issued May 18, 2011 in European Patent Application No. 09 006 484.1-2223.
(Continued)

*Primary Examiner* — Justin Shepard
(74) *Attorney, Agent, or Firm* — Oblon, McClelland, Maier & Neustadt, L.L.P.

(57) ABSTRACT

A system for retrieval of executable applications, comprising: a broadcast tele-vision receiver apparatus; and a server; wherein the broadcast television receiver apparatus includes a communication unit having an interface for bidirectional communication with a network and adapted to determine channel information from a currently decoded channel carried in a broadcast television signal, the channel information identifying the currently decoded channel, the communication unit being further adapted to send the channel information to a server over the network, and to receive application information from the server, the application information describing a set of applications which are available for execution, and to receive executable code components for the set of applications corresponding to the application information, and wherein the broadcast television receiver apparatus further includes a data processor adapted to execute the application while the channel is decoded; and wherein the server is adapted to receive the channel information over the network, to determine the application infor-
(Continued)

mation by analyzing the channel information, and to send the application information to the communication unit.

19 Claims, 9 Drawing Sheets

(51) Int. Cl.
      *H04N 21/4722*    (2011.01)
      *H04N 21/442*     (2011.01)
      *H04N 21/472*     (2011.01)
      *H04N 21/84*      (2011.01)
      *H04N 21/478*     (2011.01)
      *H04N 21/454*     (2011.01)
      *H04N 21/8405*    (2011.01)
      *H04N 7/173*      (2011.01)
      *H04N 21/258*     (2011.01)
      *H04N 21/435*     (2011.01)
      *H04N 21/654*     (2011.01)
      *H04N 21/658*     (2011.01)

(52) U.S. Cl.
      CPC . *H04N 21/25833* (2013.01); *H04N 21/25841* (2013.01); *H04N 21/435* (2013.01); *H04N 21/442* (2013.01); *H04N 21/443* (2013.01); *H04N 21/4433* (2013.01); *H04N 21/4437* (2013.01); *H04N 21/44222* (2013.01); *H04N 21/454* (2013.01); *H04N 21/472* (2013.01); *H04N 21/478* (2013.01); *H04N 21/4722* (2013.01); *H04N 21/654* (2013.01); *H04N 21/658* (2013.01); *H04N 21/84* (2013.01); *H04N 21/8405* (2013.01)

(56) References Cited

U.S. PATENT DOCUMENTS

| | | | |
|---|---|---|---|
| 2003/0084128 A1* | 5/2003 | Anderson | H04L 67/06 709/220 |
| 2003/0105969 A1* | 6/2003 | Matsui | G06Q 20/341 713/194 |
| 2005/0015796 A1 | 1/2005 | Bruckner et al. | |
| 2005/0097549 A1 | 5/2005 | Chu et al. | |
| 2008/0016529 A1 | 1/2008 | Kitagawa | |
| 2008/0216108 A1 | 9/2008 | Beaunoir et al. | |
| 2009/0052864 A1* | 2/2009 | Ohde | 386/83 |
| 2009/0083780 A1 | 3/2009 | Beyabani | |
| 2009/0100361 A1 | 4/2009 | Abello et al. | |
| 2010/0058423 A1* | 3/2010 | Yaussy et al. | 725/118 |
| 2010/0146529 A1 | 6/2010 | Heath et al. | |
| 2010/0205274 A1 | 8/2010 | Gharabally et al. | |

FOREIGN PATENT DOCUMENTS

| | | |
|---|---|---|
| JP | 2004-153752 A | 5/2004 |
| JP | 2007-534217 A | 11/2007 |
| WO | WO 2008/016465 A2 | 2/2008 |
| WO | WO 2008/115032 A1 | 9/2008 |
| WO | WO 2009/025464 A2 | 2/2009 |
| WO | WO 2009/025464 A3 | 2/2009 |
| WO | WO 2009/057950 A2 | 5/2009 |
| WO | WO 2009/057950 A3 | 5/2009 |

OTHER PUBLICATIONS

Office Action issued Nov. 7, 2011, in European Patent Application No. 09 006 484.1.
Chinese Office Action issued Feb. 17, 2012, in Patent Application No. 201010183078.3 (with English-language translation).
European Office Action issued Mar. 27, 2012 in patent application No. 09 006 484.1.
Office Action issued Sep. 24, 2012 in European Patent Application No. 09006484.1.
European Office Action Issued Feb. 14, 2013 in Patent Application No. 09 006 484.1.
Japanese Office Action issued Jan. 28, 2014 (partial English translation only).

* cited by examiner

SYSTEM FOR RETRIEVAL OF EXECUTABLE APPLICATIONS

CROSS REFERENCE TO RELATED APPLICATIONS

The present application is a Continuation of U.S. patent application Ser. No. 12/772,495, filed 3 May 2010 which claims priority to European Application 09006484.1, filed on 13 May 2009, the contents of which being incorporated herein by reference in their entirety.

BACKGROUND OF THE INVENTION

Field of the Invention

An embodiment of the invention relates to a system for retrieval of executable applications. Further embodiments of the invention relate to a broadcast television receiver apparatus, a server, a method, and a computer program product for retrieval of executable applications.

Description of the Related Art

Nowadays, broadcast television receiver apparatuses have been made available, which on the one hand allow receiving broadcast signals, and on the other hand enable access to further networks, such as the internet. Further, the processing power of the television apparatuses has increased. This allows provision of applications and additional content to users of the broadcast television receiver apparatuses.

SUMMARY

It is an object of the invention to provide a system for retrieving executable applications, thereby enhancing the user's television experiences.

This object is solved by a system, a broadcast television receiver apparatus, a server, a method, and a computer program product as hereinafter described.

Further details of the invention will become apparent from a consideration of the drawings and ensuing description.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is further to be understood that the features of the various embodiments described herein may be combined with each other, unless specifically noted otherwise.

Figure 1A:
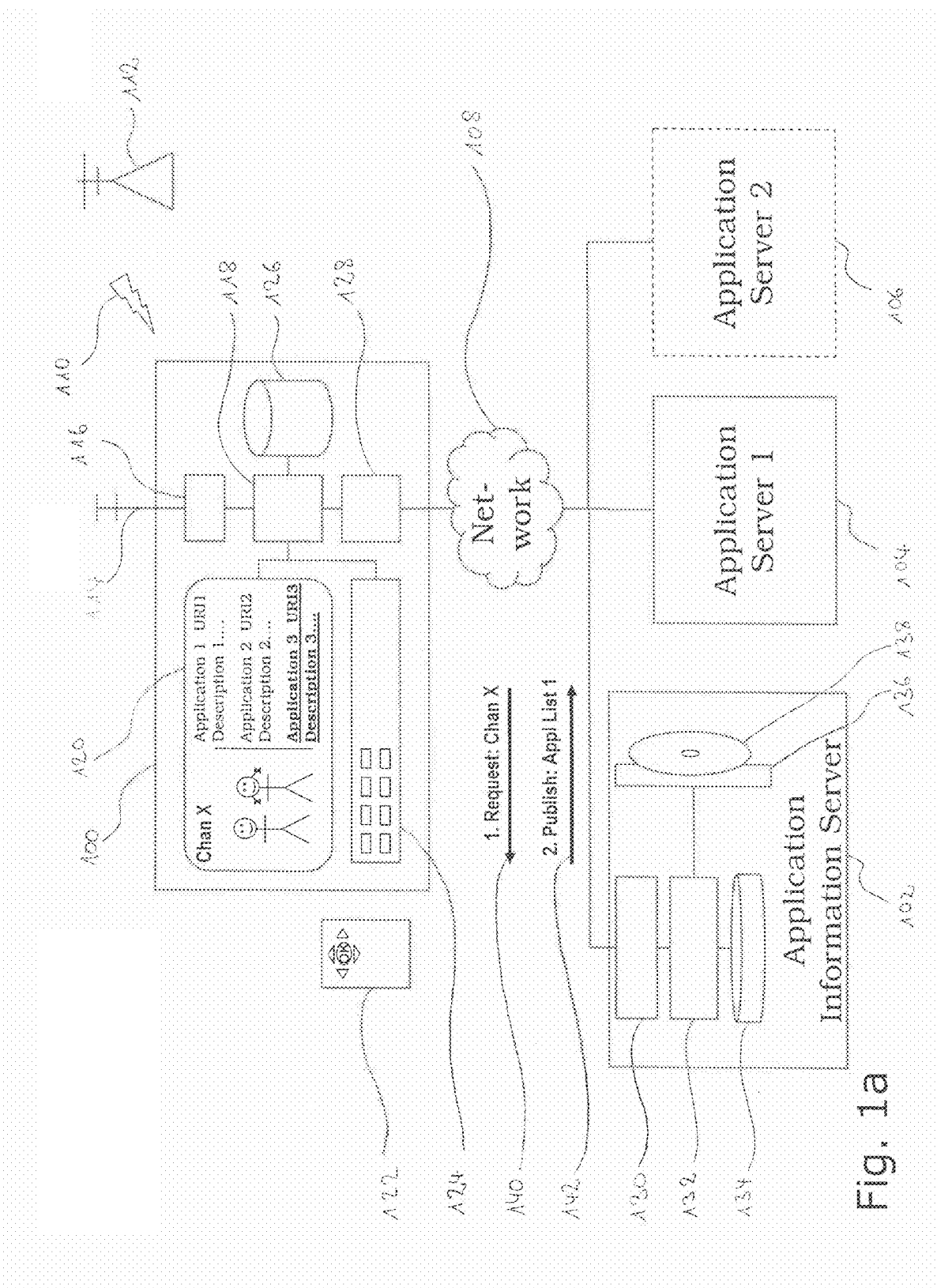
FIG. 1a illustrates an embodiment of a system for retrieval of executable applications, in which a request for content is sent to an application information server and an application list is published by the application information server.
Figure 1B:
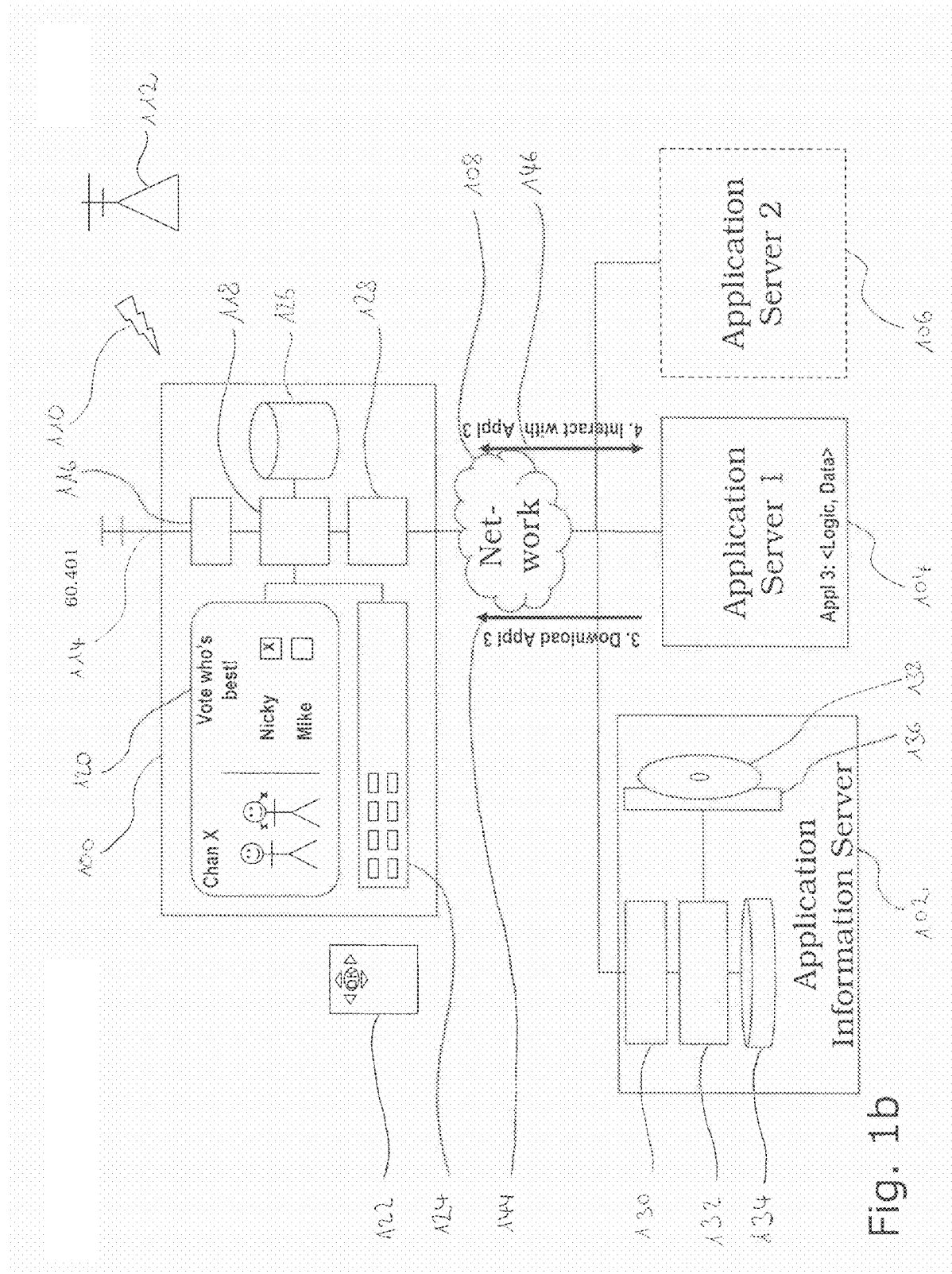
FIG. 1b illustrates the embodiment of FIG. 1a when a download of an application and an interaction with an application server takes place.
Figure 1C:
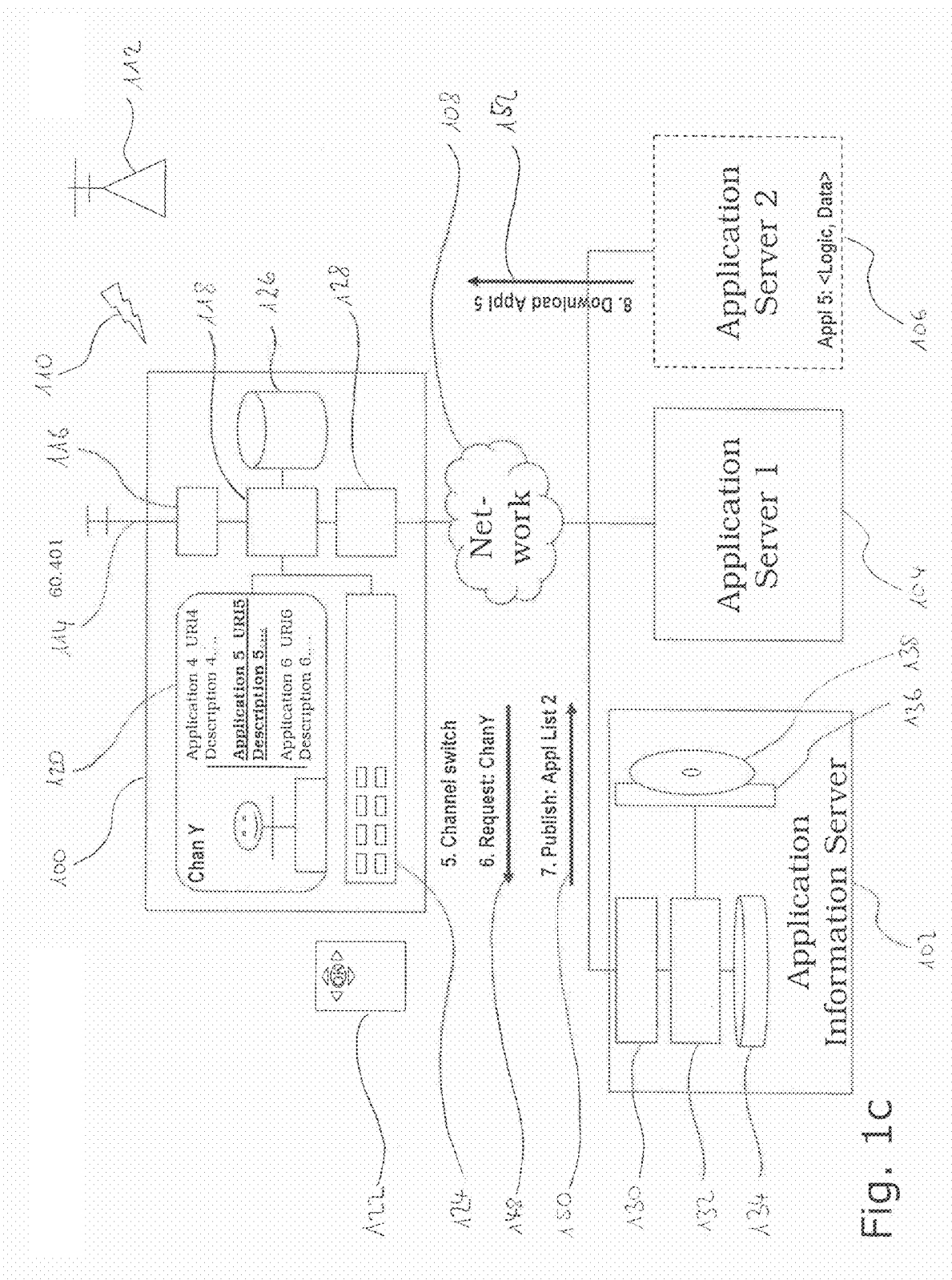
FIG. 1c further illustrates the embodiment of FIG. 1a when a channel switch has occurred.

In FIGS. 1a to 1c, a system for retrieval of executable applications including a television apparatus 100 for receiving broadcast television signals (broadcast television receiver apparatus), a server 102 (in the following referred to as "application information server" 102), and further servers 104, 106 (in the following referred to as "first and second application servers" 104, 106) is illustrated. Communication between television apparatus 100, application information server 102, and first and second application servers 104 and 106 may take place over network 108.

Television apparatus 100 is adapted to receive a broadcast signal 110 (broadcast television signal) transmitted by a broadcast station 112. Broadcast signal 110 may be an analog or a digital television broadcast signal, e.g. in accordance with a DVB, ATSC, ISDB or DMB standard. Accordingly, transmission of the broadcast signal may be realized by terrestrial transmission (DVB-T, DVB-T2, DVB-H, DVB-SH, ATSC, ATSC-M/H, ISDB-T, or T-DMB), by cable transmission (DVB-C, ATSC, ISDB-C), by microwave transmission (DVB-MT, DVB-MC, or DVB-MS), by satellite transmission (DVB-S, DVB-S2, DVB-SH, DVB-SMATV, ISDB-S, or S-DMB) and/or by internet transmission (DVB-IPTV, DVB-IPI).

In case broadcast signal 110 is a digital television signal, service information (SI) may be transmitted within broadcast signal 110, such as DVB-SI according to the DVB standard. The service information may include various data, such as network information, channel information, program information, time and date information and/or running status information descriptive of programs that are currently aired or that will start in the near future.

Broadcast signal 110 may be received at television apparatus 100 e.g. by an antenna 114 transmitting broadcast signal 110 to a tuner 116. Tuner 116 may tune to channels and/or services transmitted by broadcast signal 110, thereby decoding the channels. Further, a data processor 118 may be provided for displaying the channel at a display 120, e.g. the currently aired program or event.

"Channel" should be understood as that which is conventionally understood by a user, e.g. BBC1, ZDF, TF1 or Fox News, which is termed a service in the DVB environment. Program or Event should be understood as broadcast of finite duration on a channel, such as Desperate Housewives, Tuesday 24 March, 18.45 to 19:00 and a channel name or number.

For allowing a user to interact with television apparatus 100, various input devices may be provided, such as, for example, a remote control 122 and a keypad 124.

Further, television apparatus 100 may include a storage 126 for storing software and data.

The software stored in storage 126 may include, for example, an operating system for operating television apparatus 100, and application software to be run e.g. on demand by a user. The application software may, for example, include an application for providing an electronic program guide. Further, the software may include an application execution engine, providing a runtime environment for executing further applications and/or executable code components, such as widgets, gadgets, applets or the like. The further application may, for example, be interpreted by an alternative software stack running on television apparatus 100, e.g. a software stack configured to interpret XML or RSS feeds (as Rich Site Summary, RDF Site Summary, and/or Really Simple Syndication), by which the further applications may be defined.

The data stored in storage 126 may include content, such as multimedia data, e.g. video data recorded from the broadcast signal, and further multimedia data, such as images, audio/video data (in files or streams), textual data and/or executable applications, such as video games. Further, meta data related to content available for display, and/or a data for running the electronic program guide may also be stored in storage 126. Still further, data related to applications that may be run within the application engine may also be stored, such as data defining an application logic and information to be made available to the user when the application is run.

For communicating over network 108, e.g. with application information server 102 and first and second application servers 104, 106, a communication unit 128 may be provided at television apparatus 100. This may be integrated in the television apparatus or may be a set top box or side box connectable to the television apparatus.

Accordingly, also at application information server 102 a communication unit 130 connected to a data processor 132 may be provided. Data processor 132 may further have access to a storage 134 and to a reading unit 136.

Reading unit 136 may be adapted to read a data storage medium 138, which may, for example, include program instructions. The program instructions, when loaded into data processor 132, may be adapted to cause application information server 102 to perform a method for retrieval of executable applications in accordance with one of the embodiments described herein. The computer program instructions may further be adapted to cause transmission of applications and data over network 108 to television apparatus 100, the applications causing television apparatus 100 to contribute to the method.

At television apparatus 100, retrieval of executable applications may take place while a channel is being decoded, e.g. being viewed by a user. Decoding the channel may be achieved by tuning tuner 160 to the channel transmitted with broadcast signal 110, e.g. for displaying the channel at display 120 to be viewed by the user.

Via network 108, television apparatus 100 may have access to a multitude of content and applications. However, it may be of interest for broadcasters and content owners of the broadcast data to control the access to content and applications which may be displayed on connection with the broadcast data. For example, the broadcasters and content owners may want to have an influence and/or to maintain control of what content and applications are made available to the user when watching their channels. Further, there may exist regulations or business rules defining what can and cannot be done in terms of displaying applications and content together with the broadcast signal. This may ensure that the content owner's rights are not infringed when their content is on air. An example of this is the restriction of "overlaying" applications or content over the broadcaster's content.

For influencing and/or maintaining control of what content and applications are made available to the user when watching the channel, there may exist a definition of what content and applications may be available, e.g. be allowable or even suggested/recommended to be used in connection with the channel. Allowable and/or recommended content and applications may for example be defined by broadcasters, content owners, internet service providers, a manufacturer of television apparatus 100 or a provider of application information server 102.

For example, a broadcaster may want to suggest an application that enables the user to participate at e.g. a voting procedure related to a game show displayed at his channel, so that the voting procedure is to be made available or is recommended. An application available for execution is therefore to be understood as an application which is obtainable, i.e. accessible for execution in conjunction with the decoding of the channel. The application may, for example, be recommended or suggested for being executed in conjunction with the decoding of the channel. For example, access to the application may be given by the application information.

Further, the broadcaster may want to exclude a competitor's advertisings from being displayed in connection with one of his channels, the competitor's advertizing consequently being not allowed for display in connection with the channel. An application allowable for execution whilst a channel is decoded is therefore to be understood as an application to which a consent for execution in conjunction with the decoding of the channel is given, e.g. by the broadcaster. The consent may be defined by a rule, e.g. a business rule.

The definitions of the available, allowable and/or recommended content may be implemented, e.g. in a rule set, at application information server 102, as will be described in detail below.

Channel information may therefore be requested as a basis for retrieving executable applications, executable code components and/or content available, allowable and/or recommended for execution in connection with the channel at television apparatus 100. Consequently, data processor 118 and/or communication unit 128 may analyze the channel currently decoded, and may generate channel information descriptive of the channel.

To determine the channel information, data processor 118 or communication unit 128 may refer, for example, to service information included in a data stream transmitted by broadcast signal 110. In the service information, the available channels or services may be uniquely identified by a channel identifier, e.g. by a number commonly referred to as "triplet" or triplet information. Triplet information, as used in digital television broadcasting, includes three parts: a first part, also referred to as original network ID (OID), a second part, also referred to as transport stream ID (TSID), and a third part, also referred to as service ID (SID), identifying the channel and/or service. In the case of DVB, the triplet may be written as DVB://OID.TSID.SID. According to the DVB standard, the triplet may be used by television tuners to map a channel to the specific broadcast frequency. In the example, the triplet may be used for determining the channel information. Alternatively, also the channel name or a channel identifier, included e.g. in broadcast signal 110, may be used for generating channel information.

The channel information may then be transmitted by communication unit 128, providing an interface for bidirectional communication with network 108, to application information server 102, which receives the channel information via communication unit 130.

Reception of the channel information by application information server 102 may be interpreted as a request for receiving applications that can be accessed (i.e. are available and/or allowable) and executed at television apparatus 100 and that are admitted and/or suggested for use while the channel is received. In the example depicted in FIG. 1*a*, a first arrow 140 illustrates the request for a list of applications available and/or allowable, e.g. suggested for execution while channel X is being viewed. As mentioned, the applications can e.g. be widgets, gadgets, applets or the like.

The request may be passed from the communication unit 130 to data processor 132, which may, as a consequence, determine application information based on the channel information. For example, data processor 132 may analyze the channel information and may generate application information descriptive of a set of applications which are available (recommended) and/or allowable for execution whilst channel X is displayed. The application information may be provided, as illustrated in the example by second arrow 142, as a first list of applications.

The first list of applications may refer to applications to be executed at television apparatus 100 in a stand-alone mode or within a framework, such as the application execution engine mentioned above. The applications may be resident applications which may be stored permanently at television apparatus 100, or temporal applications that may be deleted after having been run, e.g. when a channel switch occurs or when television apparatus 100 is switched off. The applications may provide access to data accessible over network 108, as for example in case of a calendar or clock widget, or of a whether widget providing a whether forecast for a given location, e.g. the location of television apparatus 100. Further, the applications may establish an interactive communication with a further remotely located server, as for example an application for selecting and downloading recipes presented in a cooking show. Still further, the applications may allow transmitting data to a still further remotely located server, as for example a voting widget, allowing voting for candidates of a game show or the like.

The first list of applications may be transmitted via communication unit 130 over network 108 to television apparatus 100, which may receive the first application list via communication unit 128. The first application list may then be displayed by data processor 118 at display 120. For displaying the first application list in connection with the channel being displayed, the video image may be shrunk, e.g. displayed only on a part of display 120, thereby leaving a space to display the first application list. Alternatively, the list may also be displayed in a transparent manner overlapping a video image currently displayed at the channel.

In the example depicted, the first application list includes applications 1, 2, and 3, and further related information. For example, information of how to access the respective applications may be indicated by unique resource identifiers URI1, URI2 and URI3. The unique resource identifiers may identify locations on a local server, or on a remote host if the applications are provided by a third party. The URIs may therefore indicate where to locate the application resources, such as code, images and/or further content. Further, for each of the applications, additional information, such as descriptions 1, 2, and 3 may be provided, e.g. for supporting the user when selecting an application to be accessed.

By use of an input means, e.g. remote control 122 or keypad 124 or, alternatively, by speech commands, the user may select one or several of the applications for download and/or execution. In the example depicted in FIG. 1*a*, the user has selected application 3 highlighted at display 120.

In the example, the third application may not yet be available locally at television apparatus 100. Therefore, as illustrated in FIG. 1*b* with third arrow 144, the third application, e.g. executable code components of the third application, may be downloaded over network 108. The location for retrieving the third application may be identified by resource identifier URI3, identifying first application server 104, at which the third application with its application logic and application data may be stored.

After download, the executable code components of the third application may be executed at data processor 118 and may be displayed in connection with channel X. In the example, the third application implements a voting procedure allowing the user to vote e.g. for candidates in the game show displayed at channel X. The application thereby allows interacting with first application server 104 over network 108. This enables the user to actively contribute to a TV show he is watching.

As illustrated in FIG. 1*c*, the user may switch to a further channel, e.g. by using remote control 122 or keypad 124, or by uttering a speech input to television apparatus 100. Upon the channel switch to the further channel Y, a further request for application information may be sent from television apparatus 100 to application information server 102, as indicated by sixth arrow 148. With the further request, channel information identifying channel Y may be transmitted.

Upon the channel switch to the further channel Y, execution of a certain application (e.g. the third application), which had been executed in conjunction with channel X, may be stopped, since the certain application may not be available, allowable or recommended for execution whilst the further channel Y is decoded.

Upon this request, application information server 102 publishes a second application list, as indicated with seventh arrow 150. The second application list may include further applications, such as applications 4, 5, and 6, which are available and/or allowable, e.g. suggested for execution while channel Y is displayed.

As illustrated in the example, the user may select application 5 highlighted at display 120. As indicated in the second application list, application 5 is supposed to be located at second application server 106 identified by URI5. Upon selection, application 5 may be downloaded from second application server 106, as indicated by an eighth arrow 152.

The embodiment illustrated in FIGS. 1*a* to 1*c* shows the retrieval of applications which may be related to a channel currently displayed and which are available and/or allowable for use in connection with the channel. The access to the applications is therefore enabled and/or controlled by application information server 102 providing the list of available and/or allowable applications. Consequently, even though applications of a plurality of servers, such as first and second application servers 104, 106, may be accessed, application information server 102 controls the access by collecting and publishing the application information, and thereby may be implemented as a single point of control. Consequently, even though a variety of wide spread applications provided e.g. by third party specialists may be accessed, the access is controlled, based on the channel information, at application information server 102. The application information server 102 may consequently be used for implementing rules such as business rules e.g. in a predefined rule set engine for determining the applications available and/or allowable for use in connection with a given channel. These rules may be accustomed in accordance with legal regulations and/or demands of broadcasters providing the television broadcast signals.

Figure 2:
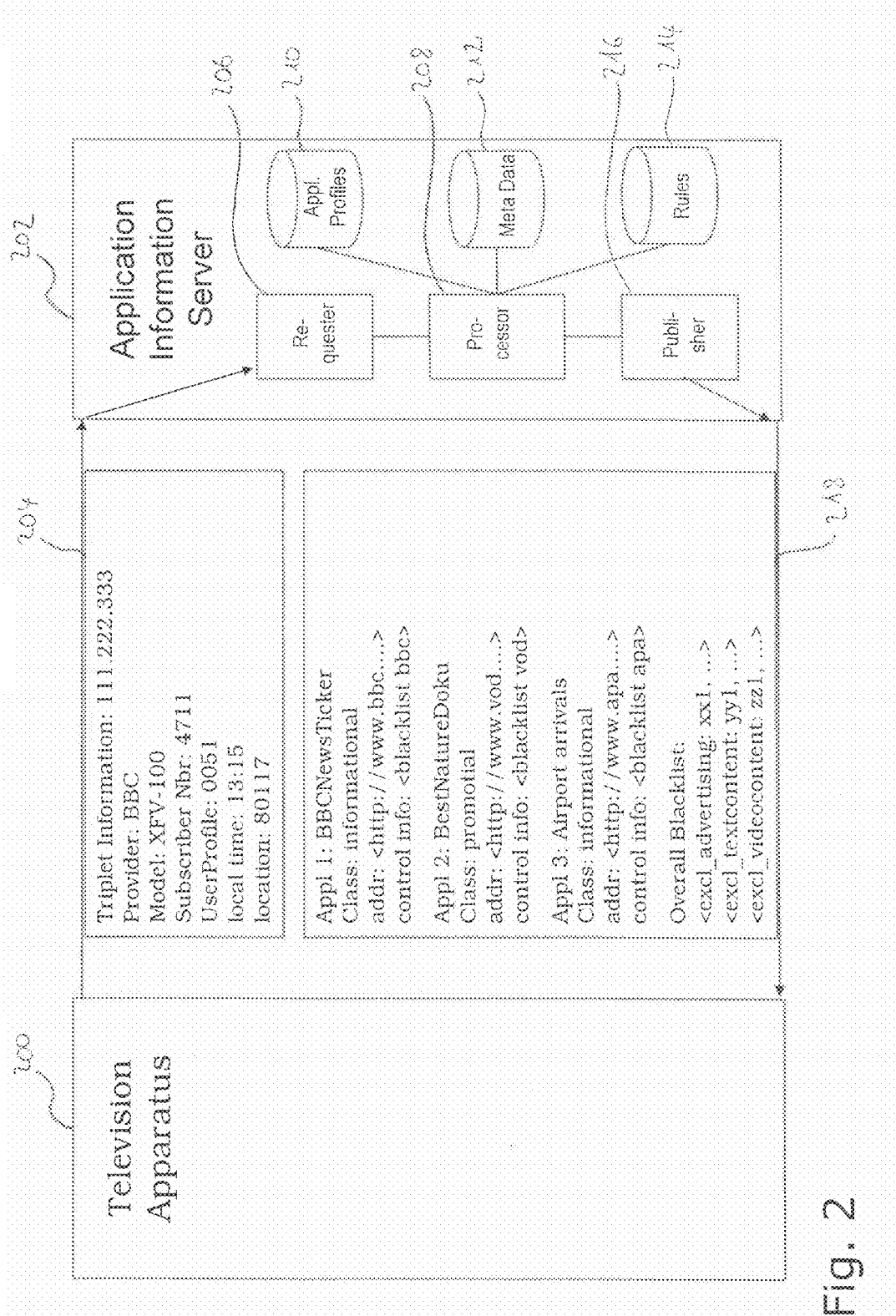
FIG. 2 illustrates data transmission within an embodiment of a sys-tem for retrieval of executable applications.

FIG. 2 illustrates a request for application information and a publishing of the application information in a further embodiment of a system for retrieval of executable applications. The embodiment includes a television apparatus 200 (broadcast television receiver apparatus) and a server 202 (application information server).

In the example, a request 204 including the channel information and further information as a basis for determining the application information is sent from television apparatus 200 to application information server 202.

In request 204, the channel information may be encoded as a triplet 111.222.333 descriptive of the channel currently displayed at television apparatus 200. Further in request 204, BBC™ may be identified as a provider of the channel.

Additionally, a model or type of television apparatus 200 may identified in request 204, e.g. by a device identifier, in the example "XFV-100". The device identifier may further encode a device profile descriptive of a hardware configuration of television apparatus. The device profile may be determined by reading hardware specification data from a memory in the device or a connected device, identifying and transmitting details of a firmware version of a device, actively scanning data storage devices to determine available storage capacity or polling or pinging network connected devices to determine network capacity.

Further, a subscriber number 4711 identifying e.g. a registered user having subscribed to the service of retrieving application information may be included. Thus, the service of retrieving applications may be coupled to obligations of payment, e.g. for the service of retrieving the application information, or as a basis for billing for the download of applications against payment. The subscriber number may further give access to a user profile stored at application information server 202.

Still further, the user profile may be transmitted with or updated by request 204, as indicated with a user profile number 0051.

Additionally, a location of television apparatus 200 may be encoded in request 204. For determining the location at television apparatus 200, various possibilities exist. For example, the location may be entered directly by the user, e.g. indicating a postal code or zip code of his home. Further, the location may also be determined by a network address, such as an IP address or the like. Still further, the location may also be determined by analyzing the broadcast signal received at television apparatus 200, e.g. by analyzing the available channels, the mapping of the channels to transport streams, or by analyzing the triplet information. Alternatively, the location of television apparatus 200 may also be determined at application information server 202, e.g. by analyzing the information received with the request, such as the subscriber number.

As further information, the local time at the location of television apparatus 200 may also be transmitted with request 204. For example, devices of a population of television apparatuses requesting the application information could reside in different time zones. In such a case, some logic could be implemented at the server side for determining the local time of a requesting device. If transmitted with the request, the local time from the device could be used to cross check for accuracy. Further, the local time transmitted could be used for simplifying the determination of the local time. Knowledge of the local time of the requesting device may be helpful for determining applications having a time based rule-set, implementing rules like for example "Don't make the big brother voting widget available until 8 PM on Friday, deactivate the widget at 8:30 PM".

When received by application information server 202, request 204 may be passed to a requester 206 implementing a listener process for capturing the information published from television apparatus 200. Further, the listener process may also be adapted to collect corresponding requests for application information, e.g. from a population of client television devices. Requester 206 may preprocess request 204, e.g. by decoding and/or completing the included information, and pass the respective data to a processor 208.

Processor 208 may determine the application information based on the information received from requester 206. For determining the application information, processor 208 may have access to various data bases, such as for example an application database 210 providing profiles of available applications and including, for example, the respective URIs and descriptions. Further, a meta database 212 providing information on meta data related e.g. to the channels and/or programs may be accessed by processor 208, and a rule set database 214 including, for example, legal regulations and provider regulations for determining which applications are available and/or allowable, e.g. recommended, for execution under predetermined circumstances.

For example, based on the triplet information, processor 208 may determine the channel and may determine the program currently displayed on the channel. Processor 208 may then query metadata base 212 for obtaining meta data related to the program currently displayed. Based on the meta data, processor 208 may then query application database 210 for identifying applications that may be of interest for a user watching the respective program. Based on the result, processor 208 may further query rule set database 214 for determining all applications that may be allowable for execution while the respective channel and/or program is being displayed. Processor 208 may then provide a list of available and/or allowable applications as application information.

In any of the database queries of processor 208, the further information transmitted by request 204 may be used.

For example, information on the provider of the channel may be used for querying rule set database 214. It may, for example, be determined by the provider that while watching one of the provided channels, any applications related to channels of other providers should be excluded from execution.

Further, the device information may also be used for querying rule set database 214, where it may be determined that for devices with predetermined hardware restrictions, only applications that are adapted to run under the respective restrictions should be proposed. For example, the application logic may be restricted to a predetermined complexity, the application data to a predetermined amount of data, and communication requirements to the network capacity or a communication bandwidth.

Further, the subscriber number may be used for determining applications to which the user of television apparatus 200 has subscribed or for which the user has paid. Thereby, access to certain applications may only be allowed if a respective fee has been paid.

Information on the user profile may be used for determining applications of special interest to the user, e.g. by querying application database 210 or meta database 212, which may also include meta data related to the applications. Further, access to applications may also be restricted depending on the user profile, thereby implementing requirements of parental control.

Further, application information may also be determined based on the local time, e.g. by querying application database 210. For example, in the early morning, applications providing information on airport or train schedules may be of particular interest, while at noon, applications related to cooking recipes may be preferred.

Additionally, information on the location of television apparatus 200 may be used for determining applications that may be of special interest at the location, such as location-based advertisings of theatres, shops, food delivery services or the like. For example, an application may be selected that may enable the user to order food from a local food delivery service. The location of television apparatus 200 may also be used for determining a language to be used by the application and for determining applications provided for certain regions or countries, such as country-related sports information.

Further, the applications to be run at television apparatus 200 may also be parameterized by the location. For example, an application informing the user about the weather forecast for the next days may be parameterized with the postal codes of the city the user lives in.

After having determined the set of allowable and/or recommended applications based on the information provided with request 204, processor 208 may generate the application information, e.g. in form of a list. The list may be published to television apparatus 200 by a publisher 216 of application information server 202 as a response 218. Publisher 216 may also publish further lists in response to the request of any client television device of the above mentioned a population of client television devices.

Response 218 published to television apparatus 200 may include the list of all allowable and/or recommended applications that may be of interest for the user. The list may further include, for each of the applications, an identifier, such as "BBCNewsTicker", an application class, such as "informational", "promotional" or "interactive", and an address, such as an URI, for accessing and/or downloading the application, e.g. application logic and/or application data.

Further additionally, response 218 may include control information for controlling display and execution of the respective. For example, the control information may define an application or a part of an application which is to be included or excluded from execution under circumstances defined by request 204. Further, the control information may define a part of data of the application which is to be included to or excluded from being displayed.

For example, this could be an inclusion/exclusion of content in view of parental control requirements, excluding content which is not suitable for display to a child of a certain age, which child may be identified by a personal user profile and/or a personal, e.g. password-protected "log-in" to the television apparatus. Further, the age of the child may be determined based on the program being watched.

Further, advertisings embedded into the television application may also be included or excluded from being displayed in accordance with demands of a television manufacturer of television apparatus 200 or of a channel provider of the channel being viewed.

For example, if television apparatus 200 is of a predetermined brand X, the manufacturer of television apparatus 200 may want to exclude any advertisings from his competitors, e.g. to exclude all advertisings for a competing brand Y.

As a further example, a broadcaster or channel provider may want to exclude any competitor adverts from appearing while a channel provided by the broadcaster is displayed at television apparatus 200. For example, a provider of a channel 1 may demand that no advertisings for events on a channel 2 may appear while viewing channel 1.

Determination of control information may be based on the rules defined in rule set database 214. It may be defined in view of any data submitted with request 204. For example, the control information may depend on the channel currently displayed at television apparatus 200, the program currently aired by the channel, the provider of the channel and/or the manufacturer of the television apparatus. Further, the control information may be defined for applications, for parts of applications such as application data and/or content, for an entirety of all applications referenced in response 218, and/or for all applications that may be run at television apparatus 200. This allows thoroughly controlling all application content displayed at television apparatus 200 in view of various demands and regulations.

The control information may include or consist of a "black list", the black list being descriptive of the applications, parts of applications or application data to be excluded from being displayed. Defining the control information as a black list may allow an easy implementation of content control at television apparatus 200, since excluding data from being displayed may be realized by a simple comparison process.

In order to achieve content inclusion or exclusion, control information may be defined by content control markers used for marking the application content, thereby determining which application content is to be included for or excluded from being displayed. The content control markers may therefore be included into the application logic and/or application data, thereby assuring that the marked content is included to or excluded from being displayed.

Consequently, control information enables an effective and efficient control of the content displayed at television apparatus 200 by defining text, video and/or audio content to be included to or excluded from display. Thereby, provider requirements, legal regulations and parental control may be guaranteed.

Figure 3A:
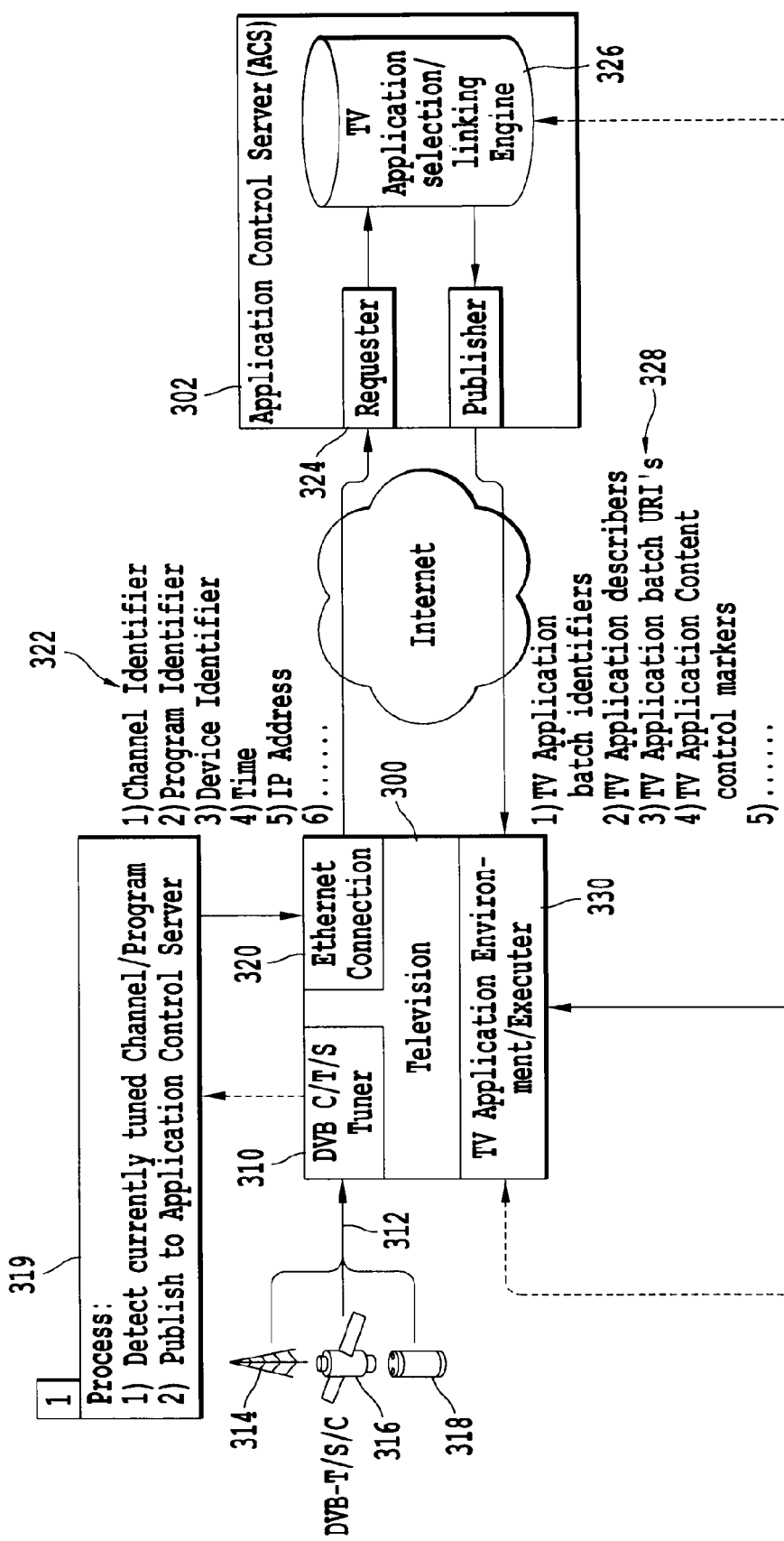
FIGS. 3A and 3B illustrate a further embodiment of a system for retrieval of executable applications.
Figure 3B:
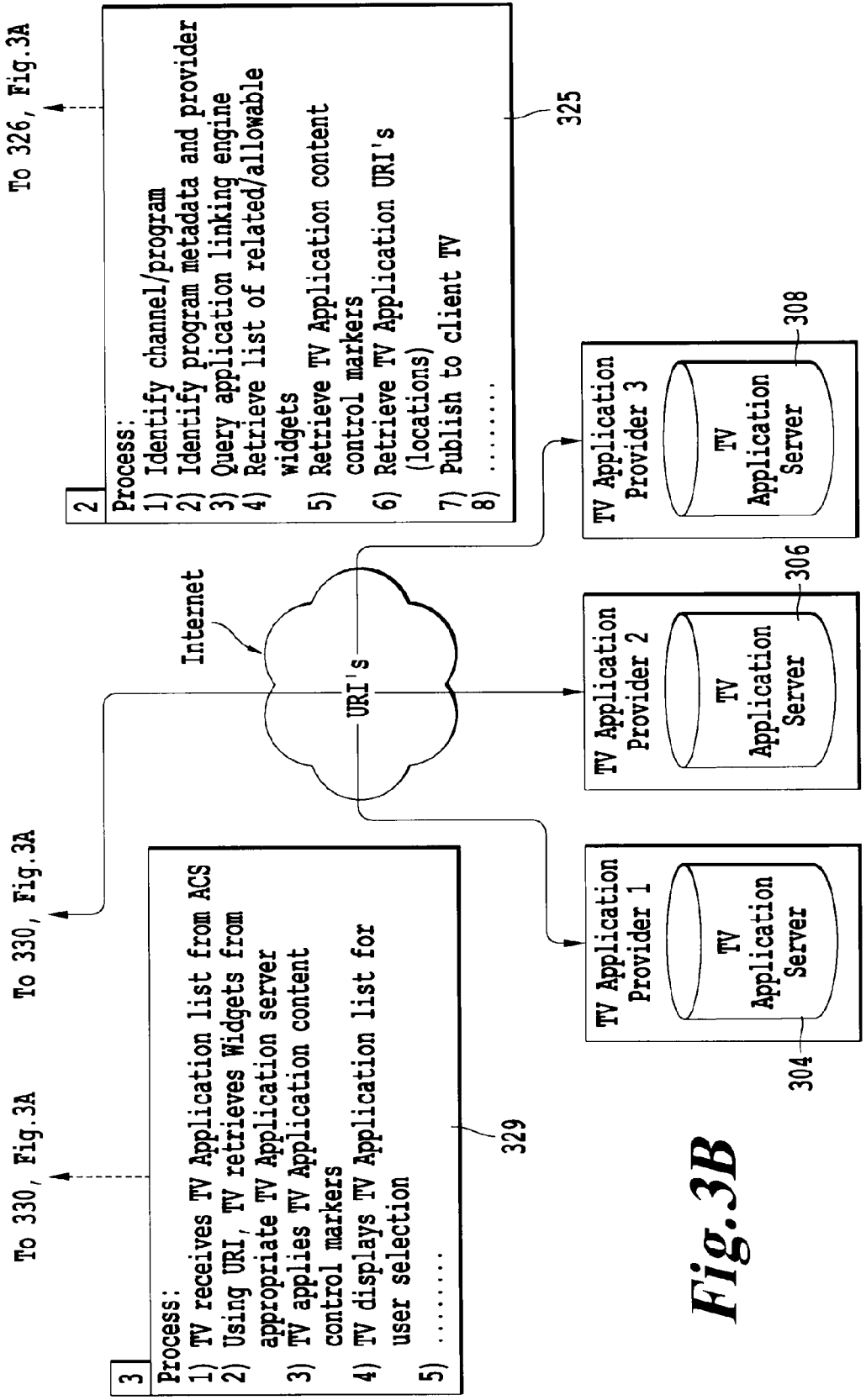

FIG. 3 illustrates a further embodiment of a system and a method of querying a remote server for a list of applications available and/or allowable to be accessed at a television apparatus while a certain channel is being watched.

The system includes a television apparatus 300 (broadcast television receiver apparatus) connected over the internet to an application control server 302 and to a first, second, and third television application servers, which television application servers are respectively provided by a first, second, and third television application providers.

Television apparatus 300 includes a tuner 310 which is capable of tuning to a channel transmitted by a broadcast signal 312, broadcast signal 312 being provided by a terrestrial broadcasting station 314, a broadcasting satellite 316 or by a cable provider 318.

On a certain event occurring at television apparatus 300, like an activation of a television application catalogue or a channel switch of the channel tuned to and/or displayed, a first process 319 may be performed. Within first process 319, the channel information may be published to application control server 302. For connecting to application control server 302, a connection 320, e.g. an Ethernet or WiFi connection, may be established, and a query 322 including the channel information may be sent to application control server 302 via the internet.

The channel information, as in the example depicted, may be defined by a channel identifier which may, for example, include the triplet information. Further supporting information may also be published to application control server 302, supporting the identification of allowable television applications. The further supporting information may include program information identifying a program currently transmitted at the channel, for example a program identifier included in service information of broadcasting signal 312, e.g. DVB-SI of a DVB-T/S/C signal. Further, the supporting information may include device identification information, e.g. defined by a device identifier, including, for example, a serial number, a MAC address, a device type or a model of television apparatus 300. Further, the local time may be included in query 322. Further, an IP address of the connected Ethernet port may be included.

Query 322 may be received by a requester 324 provided as a part of application control server 302, requester 324 implementing the listener process for capturing queries of client television apparatuses. Application control server 302 may then perform a second process 325, including analyzing query 322 for identifying the channel to which television apparatus 300 is currently tuned to, e.g. by analyzing the channel information. Further, the program identifier, device identifier, and the further supporting information may also be used for establishing criteria for television application selection within second process 325, as will be explained in detail below.

The television application selection may be performed by a television application linking engine 326 at application control server 302. At television application linking engine 326, a rule set may be implemented for defining the criteria for the television application selection. The selection may be carried out by identifying the channel and/or program currently displayed at television apparatus 300, by identifying meta data related to the program and to the provider of the program, by querying television application linking engine 326, by retrieving a list of allowable and/or available, e.g. related applications, such as widgets, gadgets, applets or further applications adapted to be run on television apparatus 300, and by retrieving the uniform resource identifiers (URIs). Further, television application content control markers may be retrieved, e.g. in accordance with the rule set implemented in television application linking engine 326.

After having determined the allowable and/or available television applications, the result may be published to television apparatus 300. For publishing the results, a response 328 may be generated and sent to television apparatus 300 over the internet. Response 328 may include television application identifiers identifying the television applications allowable and/or available for execution in connection with the channel and/or program currently displayed at television apparatus 300. Further, television application descriptors including, for example, a title and/or a description of the television application may be included. Further, television application batch URIs identifying a respective television application server from which the television application may be retrieved may be included. Additionally, the control information defined by television application content control markers may be included.

At television apparatus 300, a third process 329 may be preformed. Third process 329 may include displaying the data received with response 328 to the user, thereby informing the user about television applications available and/or allowable for execution in connection with the channel and/or program being watched. Further, the user may be enabled to select and retrieve a desired television application for execution, e.g. in a television application environment/executor 330.

For retrieving a desired application, one or more of the first, second and third television application servers 304, 306, 308 may be accessed over the internet, e.g. by using the URIs published with response 328, and the respective application may be downloaded. Further, an execution of the application within television application environment/executor 330 may be started.

During the execution, the video image displayed at the display of television apparatus 300 may be shrunk, such that a graphical user interface of the application selected may be displayed in connection with the program/channel currently displayed. Alternatively, the application may also be performed in the background, or the graphical user interface may be restricted to a small part of the display, located for example in a corner or at a border of the display. Further alternatively, the graphical user interface of the application may also be displayed, e.g. in a transparent manner or as an overlay on a video image currently displayed at the channel.

When executing the application, television application environment/executor 330 may refer to the control information and/or television application content control markers, e.g. a black list, thereby assuring that television application content is included or excluded in accordance with the control information determined at application control server 302. Consequently, content that is accessed within the television application may be controlled in accordance with the rules as determined at television application linking engine 326.

Figure 4:
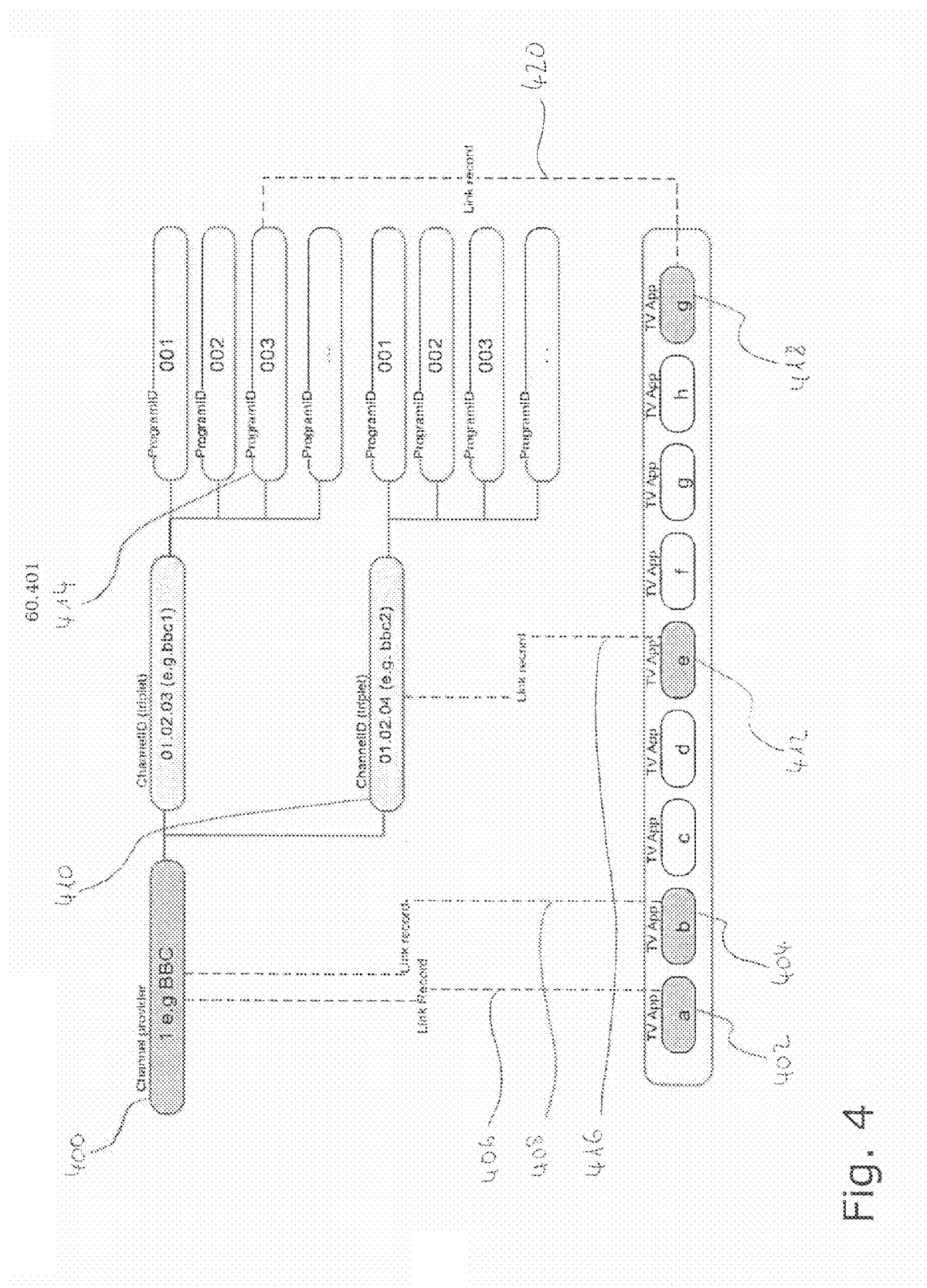
FIG. 4 illustrates the determination of content dependent on a channel provider, a channel, and/or a program being watched.

FIG. 4 illustrates the process of determining allowable and/or available, e.g. recommended applications. The process may be performed at television application linking engine 326. The example illustrates a mechanism for implementing a rule set for determining the available, e.g. related, and/or allowable applications based on information on the provider, the channel and the program. The mechanism may be implemented by linking data descriptive of the channel provider, the channel and/or the program to allowable and/or available television applications.

In the example, a channel provider 400, such as BBC™, allows and/or suggests television applications a 402 and b 404 to be executed when any of the BBC™ channels or programs is being watched. This may be defined by link records 406 and 408, respectively.

Further, when watching any program of a channel 410 provided by channel provider 400, in the example bbc2™, television application e 412 is suggested and/or allowed for execution, as illustrated with a further link record 416.

Still further, when watching program 414, i.e. program 003 on bbc1™, television application g 418 is further suggested and/or allowed for execution, as illustrated with a still further link record 418.

Consequently, when watching program 414, i.e. program 003 on bbc1™, then the television application linking engine 326 will include television applications a 402, b 404, and g 418 as television applications allowed and/or suggested for execution in the application information, e.g. in the list included in response 218 of FIG. 2. However, when watching any other program on bbc1™, only television applications a 401 and b 404 will be included. When watching a program on bbc2™, television applications a 401, b 404 and e 412 will be included.

The mechanism illustrated in FIG. 4, linking available, allowable and/or related television applications to the channel provider, the channel, and/or the program, may also include further criteria, such as the device profile, the location and/or the time of day, or even descriptive information of content items, as will be shown in the following.

Figure 5:
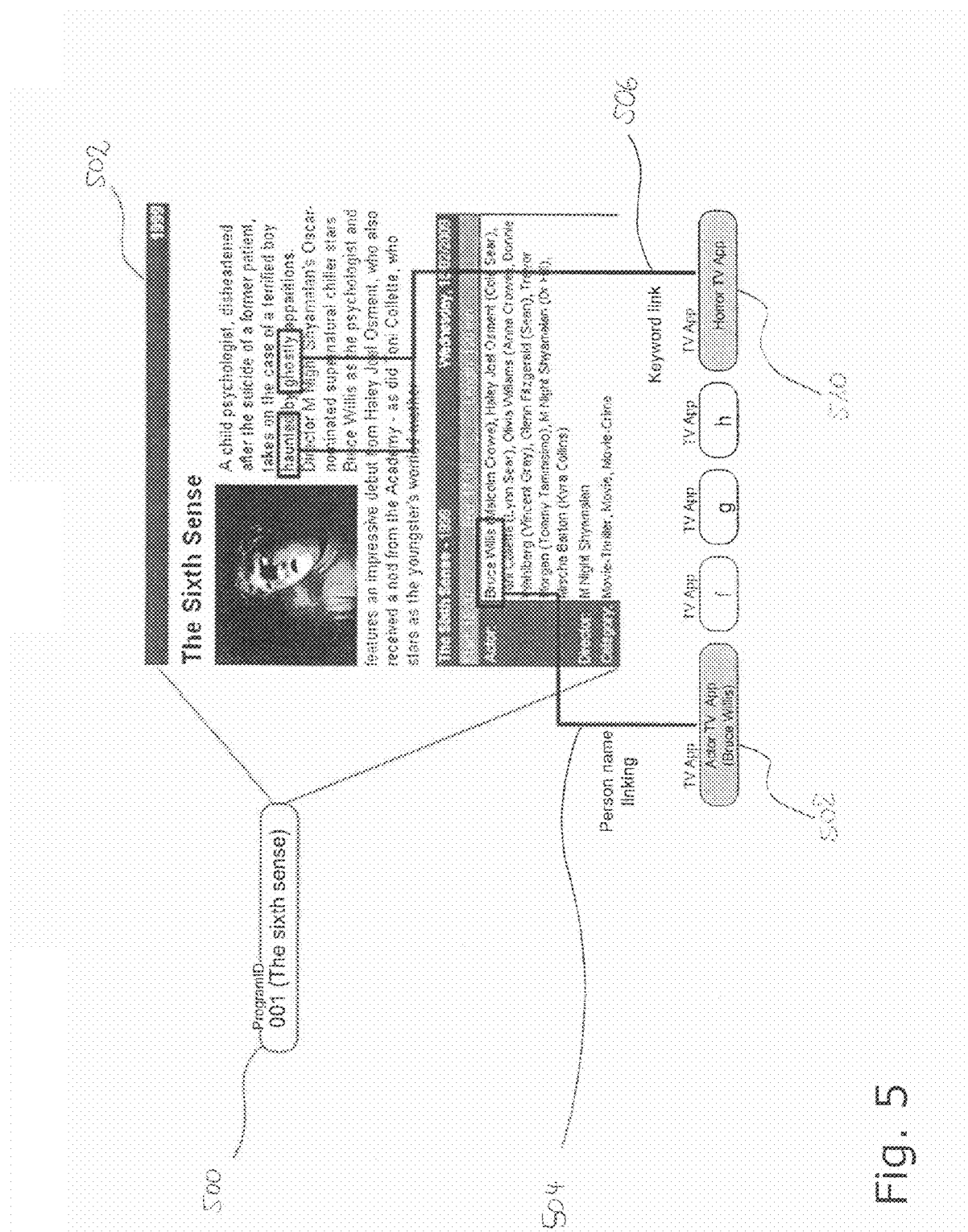
FIG. 5 illustrates the determination of content dependent on meta data of a program being watched.

FIG. 5 illustrates an example of linking television applications to descriptive meta data of a program. In the example, a program 500 with program ID 001 is supposed to be displayed, e.g. at television apparatus 300. At application control server 302, meta data 502 descriptive of program 500 is assumed to be available. In the meta data, keywords and person names, such as names of actors, may be identified. These keywords may be linked to respective television applications, as illustrated by person name link 504 and keyword link 506. Thereby, actor television application 508 related to Bruce Willis and horror television application 510 may be identified as being available, e.g. suggested, and/or allowable for being displayed together with program 500 at television apparatus 300.

In the example, the set of allowable applications depends on meta data 502 associated with program 500 being displayed at television apparatus 300. This allows providing television applications which may be of special interest to a user watching the program.

Further, the television application may establish an interactive connection with the provider of a program and/or channel, or with a collector of personal recommendations located on the internet, and thereby may allow voting, judging and/or commenting on the content item.

It should be noted that the linking mechanism illustrated in FIGS. 4 and 5 is to be seen as an example, and that various other mechanisms for determining and providing application information and for implementing the rules of determination are possible.

Figure 6:
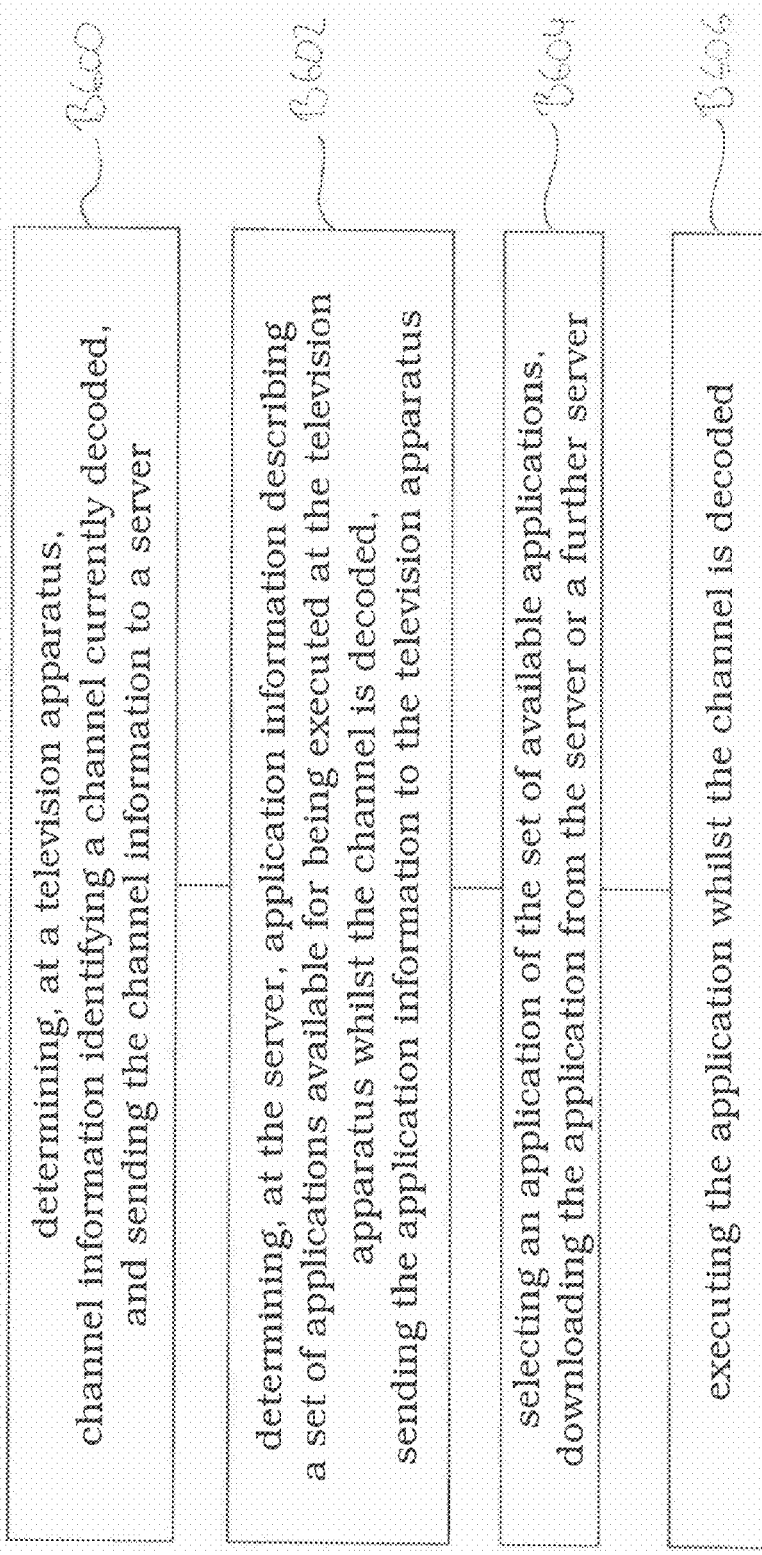
FIG. 6 illustrates an embodiment of a method of retrieval of executable applications.

FIG. 6 illustrates an embodiment of a method that may be performed within any of the systems depicted in FIGS. 1a to 3. At B600, channel information is determined, e.g. at a television apparatus (i.e. a broadcast television receiver apparatus), a handheld television receiving device or personal computer, the channel information identifying a channel currently decoded, e.g. displayed at the television apparatus. The channel information is sent to a server. At B602, application information is determined at the server, the application information describing of a set of applications available for being executed at the television apparatus whilst the channel is decoded. Further, the application information is sent to the television apparatus. At B604, it is illustrated to select an application of the set of available applications, and to download the application from a further server. The selection may, for example, be performed by a user of the television apparatus, and may be based on the application information. At B606, the application is being executed while the channel is decoded.

The embodiment allows maintaining control of what applications are made available to a user of a television apparatus (broadcast television receiver apparatus) and/or are allowable for use when watching certain channels or programs provided by a broadcaster.

The broadcasters and content owners may on the one hand determine "rules of engagement", which rules may be guaranteed by the access control performed by the server, controlling compliance with the rules.

On the other hand, access may be allowed to various television applications, e.g. from specialized third parties having experience in the field, thereby enhancing the users television experience.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. An electronic device comprising:
an interface configured to provide a bidirectional communication link over a network; and
circuitry configured to decode a received channel and control the interface to send information identifying the channel via the interface over the network, wherein
the interface is configured receive a plurality of data feeds each comprising textual data wrapped in a tag structure and corresponding to an application associated with the channel based on information derived from the information identifying the channel, and
the circuitry is configured to
identify at least a one data feed of the plurality of data feeds that is relevant to a program being broadcast on the channel based on keywords included in the information derived from the information identifying the channel;
execute a software stack configured to interpret the textual data wrapped in the tag structure of the data feeds to control omitting at least one data feed from the plurality of data feeds corresponding to the application for output with the channel based on the identified at least a one data feed of the plurality of data feeds that is relevant to a program being broadcast on the channel; and
control outputting the plurality of data feeds with the exception of the omitted at least one data feed interpreted by the software stack.

2. The electronic device of claim 1, wherein
at least one of the plurality of data feeds includes a unique resource identifier (URI) that identifies further content.

3. The electronic device of claim 1, wherein
the information corresponding to the channel includes a local time at a location corresponding to the electronic device.

4. The electronic device of claim 1, wherein
the information corresponding to the channel sent via the interface over the network includes information identifying the channel.

5. The electronic device of claim 4, wherein
the information derived from the information corresponding to the channel identifies a program corresponding to the channel.

6. The electronic device of claim 1, wherein
the information corresponding to the channel sent via the interface over the network is sent to a server from the electronic device.

7. The electronic device of claim 6, wherein
the plurality of data feeds are received from the server.

8. The electronic device of claim 1, wherein
the interface is configured to receive a list of information defining each of the plurality of data feeds.

9. The electronic device of claim 1, wherein
the circuitry is configured to omit the least one data feed from the plurality of data feeds for output with the channel based on stored parental control information.

10. The electronic device of claim 1, wherein
the circuitry is configured to omit the at least one data feed from the plurality of data feeds for output with the channel by identifying content that is not suitable for display to child of a predetermine age, which is identified by stored parental control information.

11. The electronic device of claim 1, wherein
the circuitry is configured to omit the at least one data feed from the plurality of data feeds for output with the channel by identifying an age of a viewer based on a program included in the decoded channel and omitting content that is not suitable for display based on the age of the viewer.

12. The electronic device of claim 1, wherein
the tag structure is Extensible Markup Language (XML) or Rich Site Summary (RSS).

13. An electro device comprising:
an interface configured to receive control information and a selection corresponding to a plurality of data feeds each comprising textual data wrapped in a Lag structure and derived from keyword information related to metadata associated with an application associated with a video signal channel decoded at another electro ic device;
circuitry configured to
identify at least one data feed of the plurality of data feeds that is relevant to a program being broadcast on the video signal channel based on the keyword information;
execute a software stack configured to interpret the textual data wrapped in the tag structure of the data feeds to exclude at least one of the plurality of data feeds corresponding to the application based on the identified at least a one data feed of the plurality of data feeds that is relevant to a program being broadcast on the video signal channel; and
control the interface to output the plurality of data feeds interpreted by the software stack with the at least one of the plurality of data feeds being excluded.

14. An electronic device comprising:
circuitry configured to
decode a received channel;
transmit information corresponding to the channel to another electronic device via a network;
receive a plurality of data feeds each comprising textual data wrapped in a tag structure and associated with an application identified based on information derived from the information corresponding to the channel;
identify at least one data feed of the plurality of data feeds that is relevant to a program being broadcast on the channel based on keywords included in information derived from the information corresponding to the channel;
execute a software stack configured to interpret the textual data wrapped in the tag structure of the data feeds to control omitting at least me data feed from the plurality of data feeds corresponding to the application for output with the channel based on the at least one data feed of the plurality of data feeds that is relevant to a program being broadcast on the channel; and
control outputting the plurality of data feeds with the exception of the omitted at least one data feed interpreted by the software stack.

15. The electronic device of claim 14, wherein
at least one of the plurality of data feeds includes a unique resource identifier (URI) that identifies further content.

16. The electronic device of claim 14, wherein
the information corresponding to the channel includes at least one of a channel identifier and a local time at a location corresponding to the electronic device.

17. The electronic device of claim 14, wherein
the information corresponding to the channel includes information identifying the channel.

18. The electronic device of claim 17, wherein
the information derived from the information corresponding to the channel identifies a program corresponding to the channel.

19. The electronic device of claim 14, wherein
the information derived from the information transmitted via the network corresponds to keywords associated with the channel.

* * * * *